United States Patent
Chen et al.

(10) Patent No.: US 12,302,985 B2
(45) Date of Patent: May 20, 2025

(54) ECO-FRIENDLY METHOD OF MANUFACTURING SHOE MATERIAL, SEMI-FINISHED, AND FOAMED SHOE MATERIAL MADE THEREBY

(71) Applicants: Yi-Liang Chen, Taichung (TW); Pao-Ling Wang, Taichung (TW)

(72) Inventors: Yi-Liang Chen, Taichung (TW); Pao-Hsin Wang, Taichung (TW)

(73) Assignee: GLORY STEEL ENTERPRISE CO., LTD., Taichung (TW)

( * ) Notice: Subject to any disclaimer, the term of this patent is extended or adjusted under 35 U.S.C. 154(b) by 440 days.

(21) Appl. No.: 17/732,257

(22) Filed: Apr. 28, 2022

(65) Prior Publication Data

US 2023/0189924 A1   Jun. 22, 2023

(30) Foreign Application Priority Data

Dec. 21, 2021   (TW) .................... 110147850

(51) Int. Cl.
*A43B 13/18* (2006.01)
*A43B 1/00* (2006.01)
(Continued)

(52) U.S. Cl.
CPC .......... *A43B 13/187* (2013.01); *A43B 1/0063* (2013.01); *B29B 17/0005* (2013.01); *B29C 44/02* (2013.01); *B29C 44/08* (2013.01); *B29C 45/0001* (2013.01); *B29K 2105/04* (2013.01); *B29L 2031/504* (2013.01)

(58) Field of Classification Search
CPC ...... B29C 45/0001; B29C 44/08; B29C 44/02
See application file for complete search history.

(56) References Cited

U.S. PATENT DOCUMENTS

2021/0277199 A1*   9/2021   Archer ................ A43D 119/00

FOREIGN PATENT DOCUMENTS

| CN | 1075912 A | 9/1993 |
|---|---|---|
| CN | 1247797 A | 3/2000 |

(Continued)

OTHER PUBLICATIONS

Search Report for PCT/CN2021/140008, issued on Sep. 15, 2022, Total of 2 pages.

(Continued)

*Primary Examiner* — Stella K Yi
(74) *Attorney, Agent, or Firm* — Apex Juris, pllc; R. Lynette Wylie (57) ABSTRACT

A method of manufacturing the foamed shoe material and semi-finished product including the following steps. Step S1: a foamable material is injected into a cavity of a blank mold to solidify, thereby generating a semi-finished product of the shoe material and a runner waste that are unfoamed. The runner waste could be shed for reusing directly as the foamable material without a granulating process. Step S2: the semi-finished product is cooled down and put into a cavity of the foaming mold, and the semi-finished product is evenly foamed in the cavity of the foaming mold to obtain a shoe material wherein the waste generated during the method of manufacturing the foamed shoe material could be effectively reused, and the yield rate of the shoe material thereby enhanced.

5 Claims, 8 Drawing Sheets

(51) Int. Cl.
    *B29B 17/00*     (2006.01)
    *B29C 44/02*     (2006.01)
    *B29C 44/08*     (2006.01)
    *B29C 45/00*     (2006.01)
    *B29K 105/04*     (2006.01)
    *B29L 31/50*     (2006.01)

(56) References Cited

FOREIGN PATENT DOCUMENTS

| | | | |
|---|---|---|---|
| CN | 1289675 | A | 4/2001 |
| CN | 1295920 | A | 5/2001 |
| CN | 103522480 | A | 1/2014 |
| JP | H04292101 | A | 10/1992 |
| JP | 2000270901 | A | 10/2000 |
| TW | 371262 | B | 10/1999 |
| TW | 489012 | B | 6/2002 |

OTHER PUBLICATIONS

Translation of Abstract of CN1247797, Total of 1 page.
Translation of Abstract of JP2000270901, Total of 1 page.
Translation of Abstract of CN1289675, Total of 1 page.
Translation of Abstract of CN1075912, Total of 1 page.
Translation of Abstract of JPH04292101, Total of 1 page.
Search Report for TW110147850, issued on Jun. 2, 2023, Total of 2 pages.
Translation of Abstract of TW489012B, Total of 1 pages.
Translation of Abstract of TW371262B, Total of 1 pages.
Translation of Abstract of CN103522480A, Total of 1 pages.
Search Report for TW110147850, one page.
Translation of Abstract of CN1295920, one page.

\* cited by examiner

ECO-FRIENDLY METHOD OF MANUFACTURING SHOE MATERIAL, SEMI-FINISHED, AND FOAMED SHOE MATERIAL MADE THEREBY

BACKGROUND OF THE INVENTION

Technical Field

The present invention relates generally to a technique of manufacturing foamed shoe material, and more particularly to a method of manufacturing a foamed shoe material without generating shoe material waste, a semi-finished product therefor, and the foamed shoe material.

Description of Related Art

In the shoe manufacturing industry, the shoe sole includes an outer sole, middle sole, and an inner sole. The middle sole and the outer sole are highly demanded for comfort and durability, so that the material for the middle sole and the outer sole is usually ethylene-vinyl acetate (EVA), synthetic rubber, thermoplastic elastomer (TPE), and/or other foamable material.

A conventional method of manufacturing an outsole includes injecting the foamable material to a foaming mold by an injection molding machine at a high temperature and a high pressure, and foaming the foamable material in the foaming mold to obtain the outsole. However, in an injecting process, the foamable material enters the cavity of the foaming mold through the feed runner, so that some of the foamable material is remained in the feed runner and foamed. The foamable material in the feed runner becomes a foamed waste that can not be recycled or reused. Therefore, when the shoe factory manufactures the shoe outsole every day, a significant amount of foamed waste is generated and pollutes the environment.

Additionally, in the conventional method of manufacturing the outsole, the amount of the foamable material that is fed into the foaming mold cannot be accurately controlled, so that the foamable material readily overflows out of the foaming mold during a foaming process and results in defects or cavities on the foamed outsole. The defect rate of the outsole is in a range of 6% to 10%, and the defective shoe material or the defective shoe consumes the foamable material thereby generating waste that is not biodegradable and therefore not eco-friendly Thus, the conventional method for manufacturing the shoe sole has room for improvement.

BRIEF SUMMARY OF THE INVENTION

In view of the above, the primary objective of the present invention is to provide a method of manufacturing a foamed shoe material, a semi-finished product therefor, and the foamed shoe material. The method could directly reuse the waste generated during the manufacturing process by shredding the waste. Additionally, even though the product contains the reused material, the physical properties of the product produced by the method do not deteriorate. Therefore, the method provides an environmental benefit and enhances the yield of the foamed shoe material.

The inventive subject matter provides a method of manufacturing the foamed shoe material, including the following steps: Step S1: a foamable material is injected into a cavity of a blank mold to fill the blank mold, and the foamable material is solidified in the cavity of a blank mold to obtain a semi-finished product and a runner waste that is unfoamed, wherein the runner waste is shredded for reusing as the foamable material. Step S2: the semi-finished product is cooled down and put into the foaming mold for foaming evenly to obtain a foamed shoe material.

The inventive subject matter further provides a semi-finished product for producing a foamed shoe material, wherein the semi-finished product is an unfoamed body and is divided into a plurality of sections. The plurality of sections includes a front section, a rear section, and a middle section, wherein the middle section is located between the front section and the rear section. A density difference between any two of the front section, the rear section, and the middle section is in a range of 1% to 3%.

The inventive subject matter further provides a foamed shoe material which is a foamed body. The foamed body is divided into a plurality of sections, including a fore section, a heel section, and an arch section, wherein the arch section is located between the fore section and the heel section. A density difference between any two of the fore section, the heel section, and the arch section is in a range of 1% to 3%.

With the aforementioned design, the runner waste generated in the step S1 is the unfoamed material, so that the runner waste could be reused as a foamable material by simply shredding without undergoing a granulating process. The reused foamable material could be melted and injected by the injection molding machine to make the semi-finished product, so that the runner waste is useful, thereby reducing the unrecyclable waste during the manufacturing process. The method of the present invention could promote the environmental benefit and circular economy.

Additionally, the density of each of the sections of the semi-finished product is substantially the same, so that the density distribution of the semi-finished product is even. The semi-finished product is foamed to form the foamed shoe material, so that the foamed shoe material could be manufactured by foaming once, thereby enhancing the yield of the foamed shoe material.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
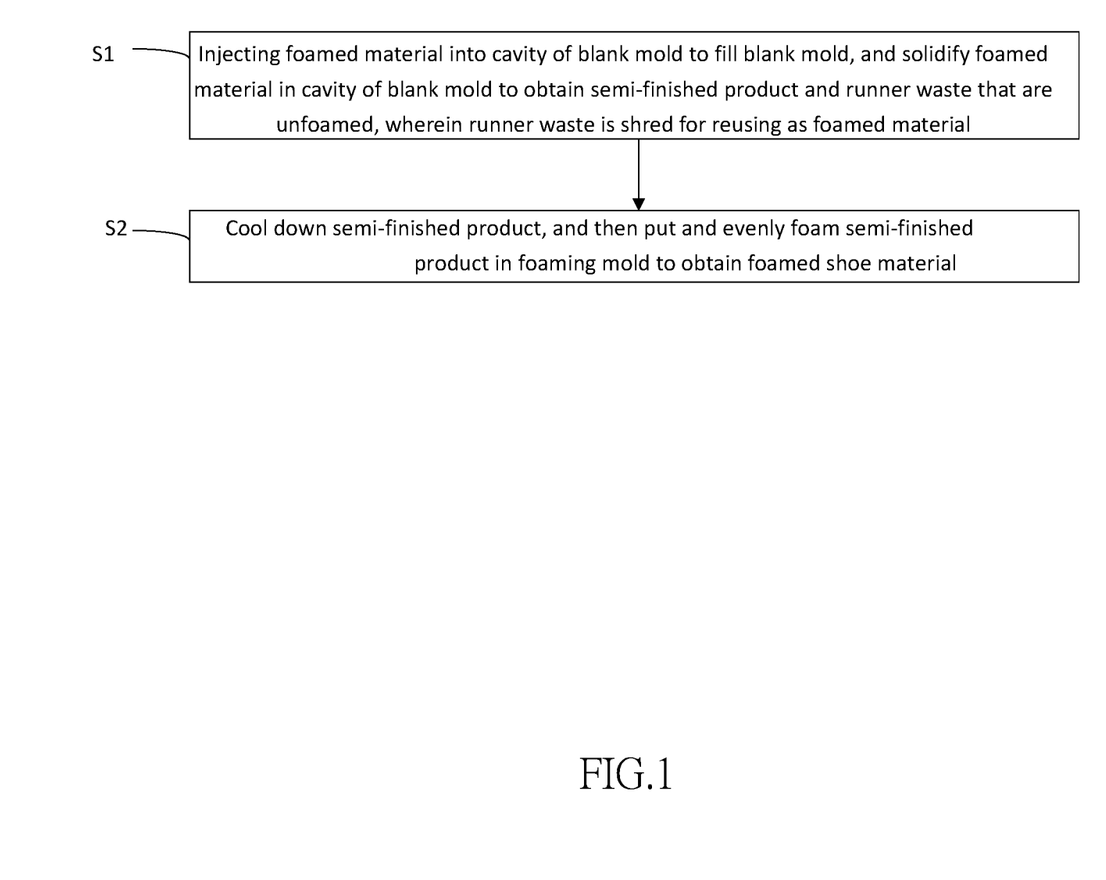
FIG. 1 is a flowchart, showing the method of manufacturing the foamed shoe material of an embodiment according to the present invention.
Figure 2:
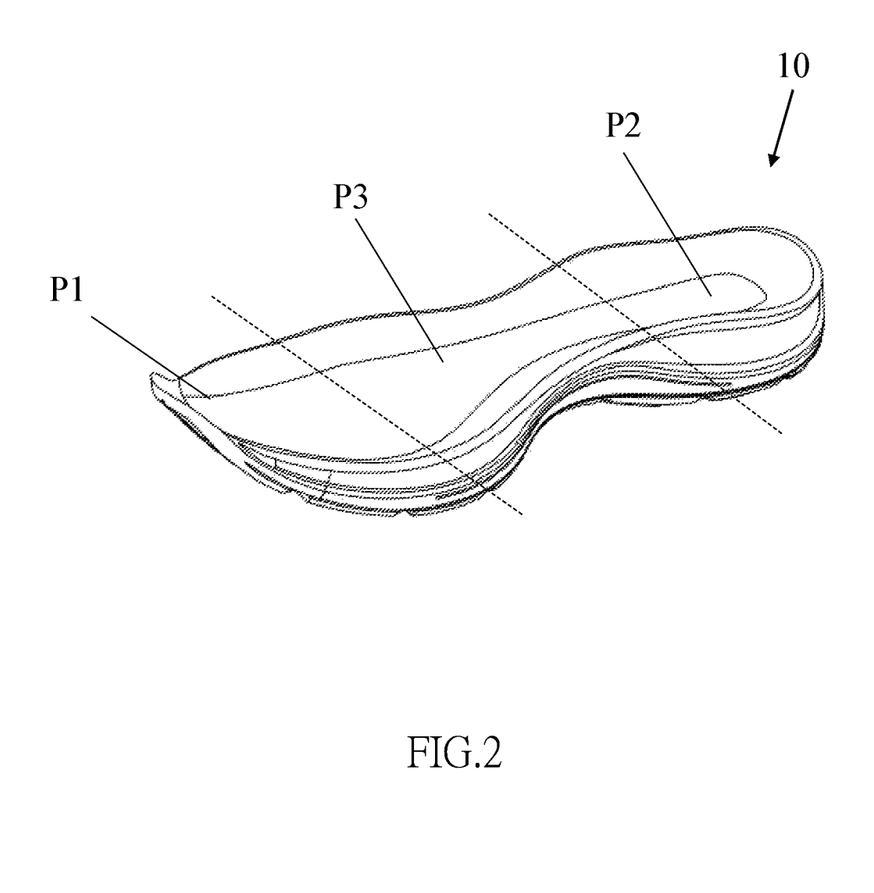
FIG. 2 is a perspective view of the semi-finished product of the foamed shoe material that is generated in the method of the illustrated embodiment of the present invention.
Figure 6:
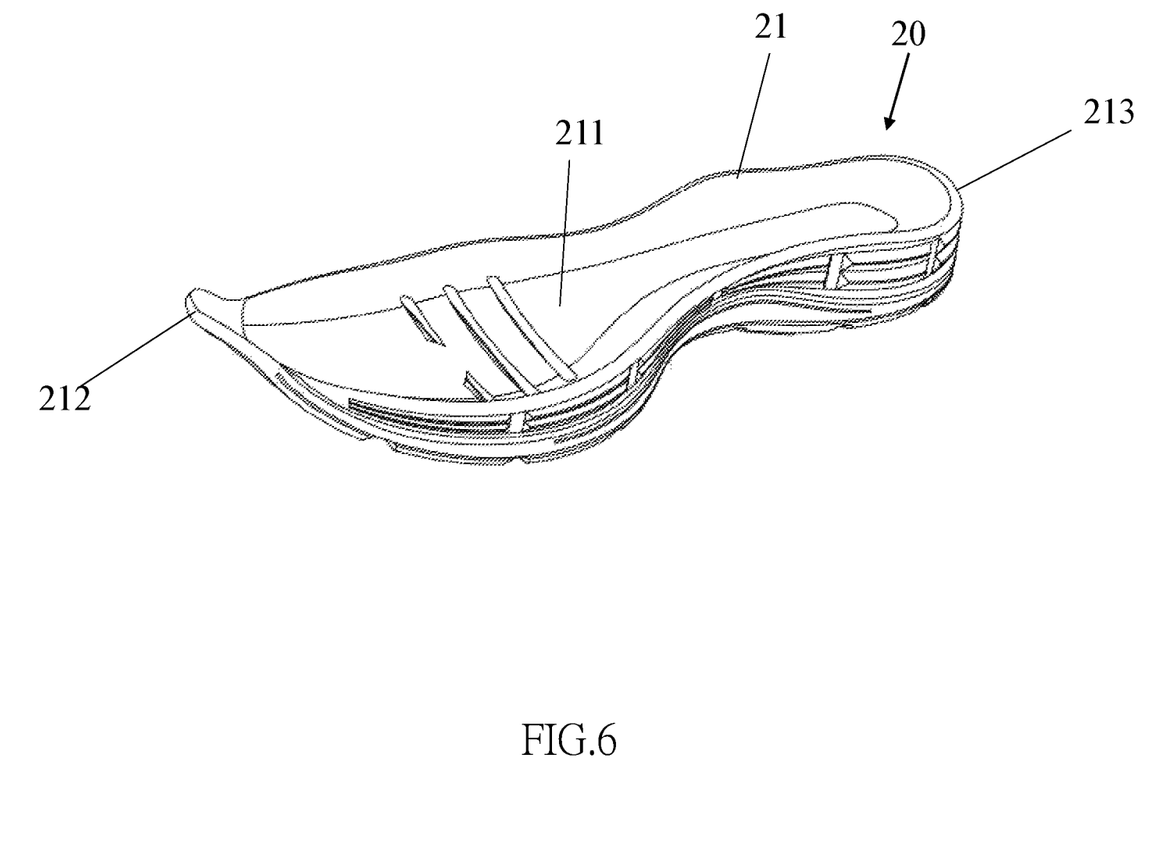
FIG. 6 is a perspective view of the foamed shoe material of the illustrated embodiment of the present invention.

A method of manufacturing a foamed shoe material of an embodiment according to the present invention is illustrated in FIG. 1. A semi-finished product 10 of a shoe material generated during the method of manufacturing the foamed shoe material is shown in FIG. 2, and a foamed shoe material 20 produced by the method of manufacturing the foamed shoe material is shown in FIG. 6. The method of manufacturing a foamed shoe material of the embodiment according to the present invention includes the following steps:

Step S1: a foamable material is evenly injected into a cavity of a blank mold (not shown) to form the semi-finished product 10 of the foamed shoe material 20 (as shown in FIG. 2) and a runner waste by solidifying, wherein the semi-finished product 10 is not foamed. More particularly, in the current embodiment, the foamable material is selected from a group including ethylene-vinyl acetate (EVA), synthetic rubber, and thermoplastic elastomer (TPE). During the injecting process, the foamable material is injected under a condition that a screw temperature is lower than 130 Celsius degrees, wherein the screw temperature means a temperature of the screw in the injection molding machine. Since a foaming temperature of the foamable material excesses 160 Celsius degrees, the foamable material is not foamed during the injecting process under a temperature lower than 130 Celsius degrees. Additionally, during the injecting process, the foamable material could be evenly distributed in the cavity of the blank mold (not shown) to form the semi-finished product 10 by controlling a pressure of injection of the foamable material, wherein the semi-finished product 10 could be an outsole blank, a cushion blank, a slipper blank, and an integrally formed shoe blank. However, it is not limited to the abovementioned. As illustrated in FIG. 2, in this exemplary embodiment, the semi-finished product 10 is an outsole blank of a sneaker.

As illustrated in FIG. 2, the semi-finished product 10 is a molded body that is not foamed. For measuring a density distribution of the semi-finished product 10, the semi-finished product 10 is divided into a plurality of sections, including a front section P1, a rear section P2, and a middle section P3. The middle section P3 is located between the front section P1 and the rear section P2. A density difference between any two of the front section P1, a rear section P2, and a middle section P3 is in a range of 1-3%. In other words, the density of each of the sections of the semi-finished product 10 produced by the step S1 is substantially the same as one another, so that the density distribution of the semi-finished product 10 is even.

In other embodiments, a number of the sections of the semi-finished product 10 could be adjusted on a required demand, as long as different sections of the density of the molded body could be properly measured.

Additionally, since the runner waste formed in the feed runner of the blank mold is not foamed yet, the runner waste could be shed for reuse as a foamable material by the injection molding machine. The runner waste could be melted and injected right after the runner waste is shed without undergoing a granulating process. Therefore, the runner waste could be reused for making another semi-finished product of the shoe material, thereby reducing the waste that could not be recycled or reused. With such design, the method of manufacturing the foamed shoe material of the embodiment of the present invention achieves a circular economy, so that the method is more environmentally friendly and cost-effective.

Figure 3:
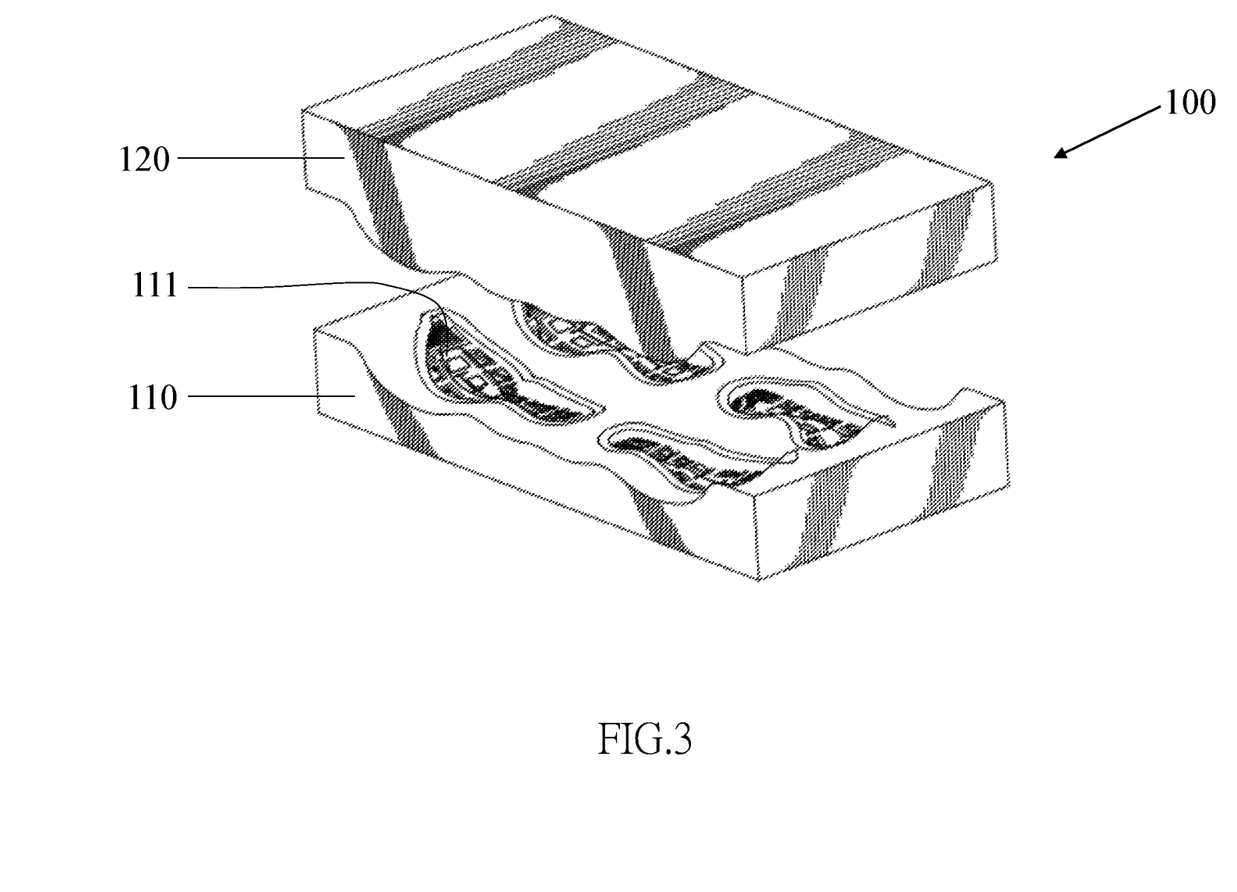
FIG. 3 is a perspective view of the foaming mold that is used during the method of the illustrated embodiment of the present invention.
Figure 4:
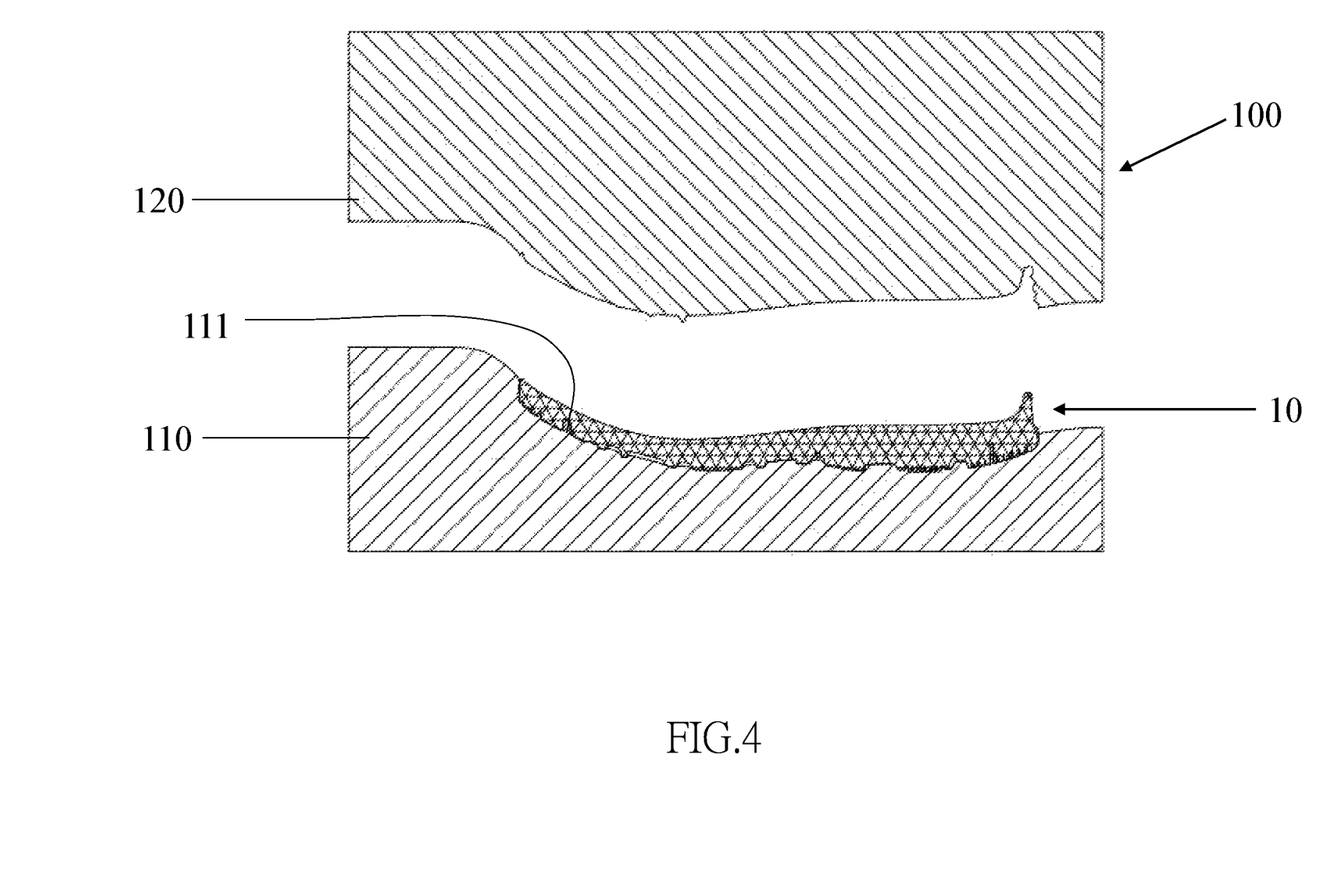
FIG. 4 is a schematic view, showing the semi-finished product shown in FIG. 2 is put into the foaming mold.
Figure 5:
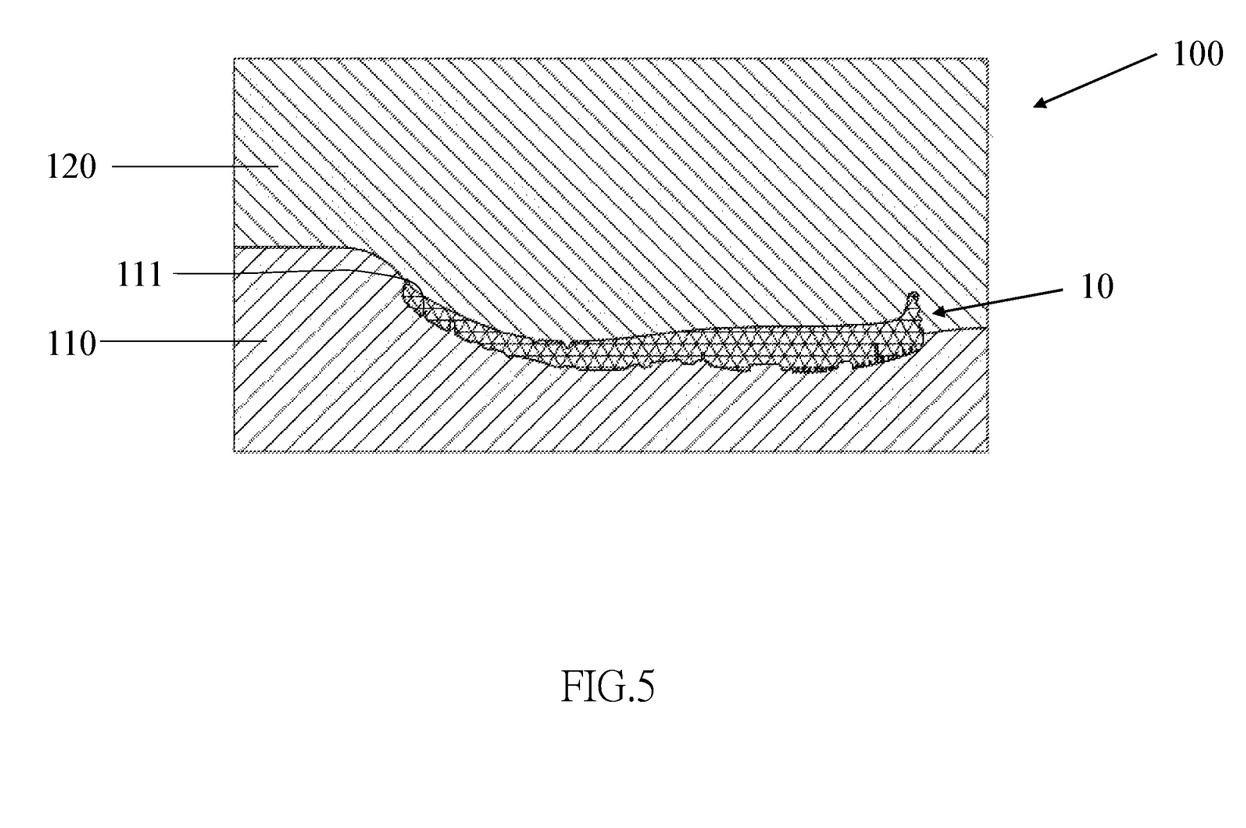
FIG. 5 is similar to FIG. 4, showing the foaming mold is closed and the semi-finished product of the foamed shoe material is located in the foaming mold.

Step S2: the semi-finished product 10 is cooled down. When the semi-finished product 10 is cooled, the semi-finished product 10 is put into a foaming mold 100 and foamed evenly to obtain the foamed shoe material 20, as shown in FIG. 3 to FIG. 6. More specifically, the semi-finished product 10 taken out from the blank mold needs to rest for more than 1 hour, so that the semi-finished product 10 could be put into the foaming mold 100 after the semi-finished product 10 completely cools down, as shown in FIG. 3 and FIG. 4. In the illustrated embodiment, the semi-finished product 10 is put in a cavity 111 of a lower mold 110 of the foaming mold 100. When the foaming mold 100 is about to close, an upper mold 120 of the foaming mold 100 is moved toward the lower mold 110 at a rate of 10 cm/s, as shown in FIG. 5. When the upper mold 120 is coupled with the lower mold 110 (namely, the foaming mold 100 is closed), a chamber of the foaming mold 100 is filled with the semi-finished product 10. A temperature in the foaming mold 100 is in a range of 150 to 200 Celsius degrees, so that the semi-finished product 10 is foamed to form the shoe material 20.

Additionally, in the step S2 of the method of manufacturing the foamed shoe material of the embodiment according to the present invention, a ratio of a volume of the semi-finished product 10 to a volume of the cavity 111 of the lower mold 110 is between 0.96 and 1.04. In the illustrated embodiment, the volume of the semi-finished product 10 is equal to the volume of the cavity 111 of the lower mold 110. Since the semi-finished product 10 may slightly shrink after the semi-finished product 10 is cooled down, the volume of the semi-finished product 10 and the volume of the cavity 111 of the lower mold 110 is not completely equal (namely the semi-finished product 10 is not completely fitted into the cavity 11). However, by making the volume of the semi-finished product 10 almost the same as the volume of the cavity 111 of the foaming mold 100, the foaming mold 100 could be precisely fed with the semi-finished product 10. Thus, the semi-finished product 10 could be foamed evenly in the foaming mold 100. Besides, exactly enough foaming material is provided by the semi-finished product 10, so that the foaming material does not overflow during the foaming process to generate burr or flash at a parting line of the shoe material 20. The foamed shoe material 20 (as shown in FIG. 5) obtained from the step S2 does not need to undergo an additional deburring process to remove any burr on the shoe material 20, thereby making the manufacturing process more smoothly and minimizing the wasted foaming material in the step S2 of the method of manufacturing foamed shoe material according to the present invention.

Figure 7:
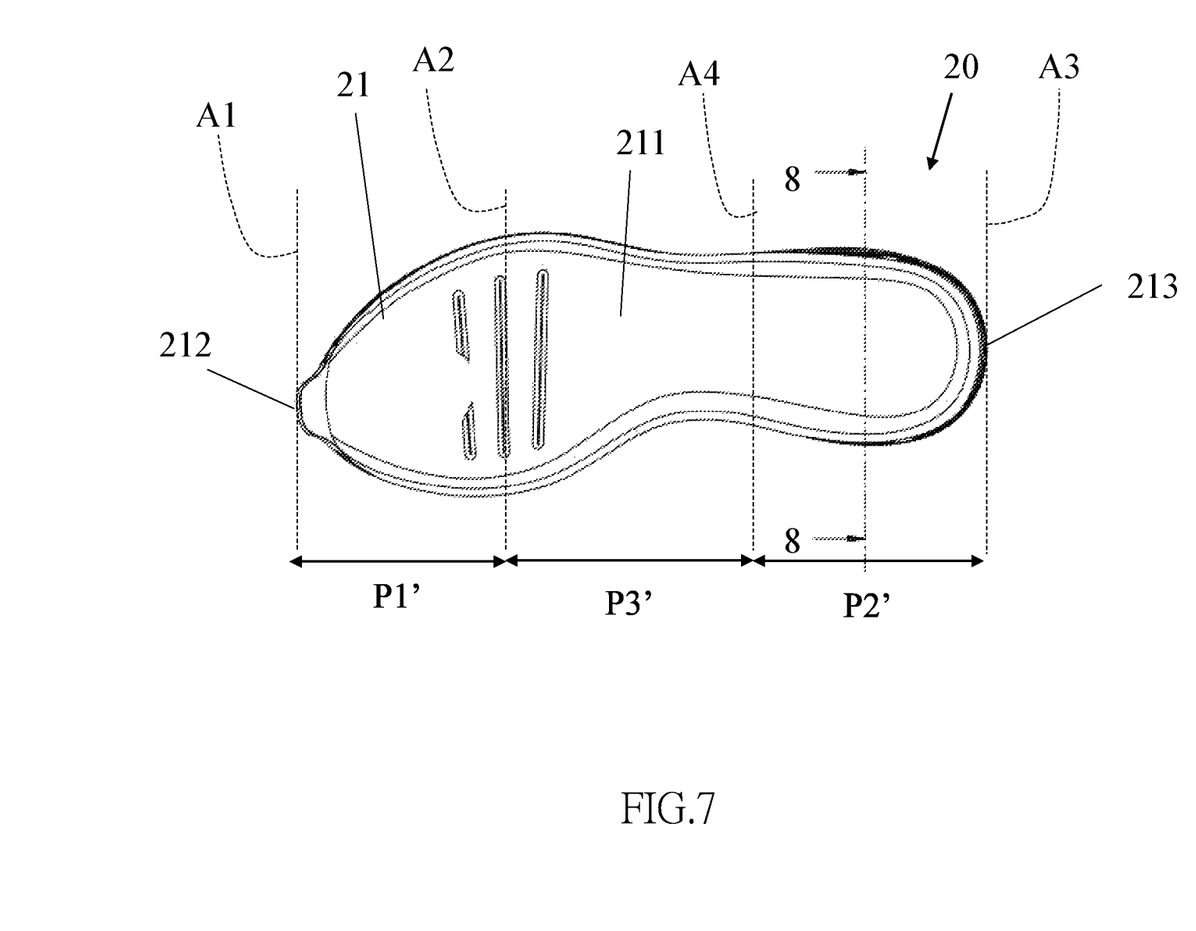
FIG. 7 is a top view of the foamed shoe material of the illustrated embodiment of the present invention; and, FIG. 8 is a sectional view taken along the 8-8 line in FIG. 7.
Figure 8:
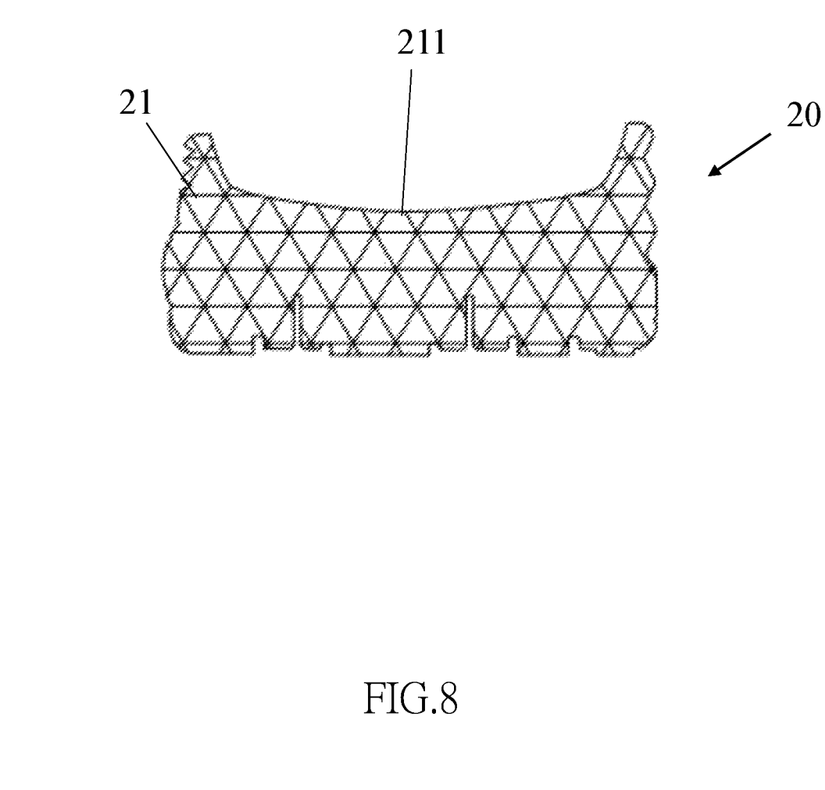

As illustrated in FIG. 6 and FIG. 8, the foamed shoe material 20 is a foamed body 21 that is integrally formed by foaming the semi-finished product 10, wherein the foamed body 21 is a shoe outsole. In other embodiments, the foamed shoe material 20 could be a slipper, a sneaker, or any other shoe component. In the current embodiment, a density distribution of the foamed shoe material 20 is measured. The foamed shoe material 20 is divided into a plurality of sections. The plurality sections includes a fore section P1', a heel section P2', and an arch section P3', wherein the arch section P3' is located between the fore section P1' and the heel section P2'. As illustrated in FIG. 7, the foamed body 21 is defined to have a surface 211 facing foot. A front side of the surface 211 facing foot has a front edge 212, and another side (i.e. a rear side) of the surface 211 facing foot has a rear edge 213, wherein the front side is opposite to the rear side. The foamed body is defined to have a first imaginary plane A1 and a second imaginary plane A2. The first imaginary plane A1 is located at the front side of the surface 211 facing foot and passes the front edge 212; the second imaginary plane A2 passes the surface 211 facing foot to allow the fore section P1' being located in the first imaginary plane A1 and the second imaginary plane A2. Besides, the foamed body 21 is defined to have a third imaginary plane A3 and a fourth imaginary plane A4. The third imaginary plane A3 is located at the rear side, which is away from the front edge 212, and passes the rear edge 213; the fourth imaginary plane A4 passes the surface 211 facing foot to allow the heel section P2' being located between the third imaginary plane A3 and the fourth imaginary plane A4. The arch section P3' is formed between the second imaginary plane A2 and the fourth imaginary plane A4.

The fore section P1', the heel section P2', and the arch section P3' are measured to obtain a density of each of sections P1', P2', P3'. The density difference between any two of the three sections (namely, the fore section P1', the heel section P2', and the arch section P3') is in a range of 1% to 3%. In other words, a density distribution of the foamed shoe material 20 obtained from the step S2 is even. With such design, the foamed body 21 could be obtained directly after the foaming process without additional deburring process, thereby enhancing the yield rate of the foamed shoe material 20.

In the present invention, the runner waste generated in the step S1 of the method of manufacturing the foamed shoe material is an unfoamed body, so that the runner waste could be directly reused for manufacturing the semi-finished product 10 by shredding. Thus, the runner waste in the step S1 does not become a waste material, but is useful. According to the present invention, the unrecycled waste generated during the method is significantly reduced, thereby improving the environmental benefit and promoting a circular economy. Moreover, in step S2, by using the foaming mold 100 to precisely feed the semi-finished product 10, the foamed shoe material 20 does not form any flash at the parting line, so that a deflashing process is not necessary, thereby simplifying the production of the foamed shoe material 20 and avoid creating waste. Thus, the method of manufacturing the foamed shoe material according to the present invention does not generate any waste, which is an eco-friendly and clean method of manufacturing.

Additionally, the density of each of the sections of the semi-finished product 10 is substantially the same, so that the density distribution of the semi-finished product 10 is even. The semi-finished product 10 could be foamed once to form the foamed shoe material that is completely foamed, thereby improving the yield rate of the foamed shoe material of the method according to the present invention.

It must be pointed out that the embodiment described above is only a preferred embodiment of the present invention. All equivalent structures and methods which employ the concepts disclosed in this specification and the appended claims should fall within the scope of the present invention.

What is claimed is:

1. A method of manufacturing a foamed shoe material, comprising:
    step S1: injecting a foamable material into a cavity of a blank mold to fill the blank mold, and solidifying the foamable material in the cavity of the blank mold to obtain a semi-finished product and a runner waste that are unfoamed, wherein the runner waste is shred for reusing as the foamable material; and
    step S2: cooling down the semi-finished product, and putting and evenly foaming the semi-finished product in a foaming mold to obtain a foamed shoe material, wherein in the step S2, the semi-finished product is put in a cavity of a lower mold of the foaming mold; an upper mold of the foaming mold is moved toward the lower mold at a rate of 10 cm/s to close the foaming mold; before the foaming mold is completely closed, a surface of the semi-finished product is preheated and softened in the cavity of the lower mold; when the foaming mold is completely closed, the semi-finished product fills a chamber of the foaming mold.

2. The method as claimed in claim 1, wherein in the step S1, the foamable material is injected under a condition that a screw temperature is lower than 130 Celsius degrees.

3. The method as claimed in claim 1, wherein in the step S1, the semi-finished product is divided into a plurality of sections, and a density difference between any two of the plurality of sections is in a range of 1% to 3%.

4. A method of manufacturing a foamed shoe material, comprising:
    step S1: injecting a foamable material into a cavity of a blank mold to fill the blank mold, and solidifying the foamable material in the cavity of the blank mold to obtain a semi-finished product and a runner waste that are unfoamed, wherein the runner waste is shred for reusing as the foamable material; and
    step S2: cooling down the semi-finished product, and putting and evenly foaming the semi-finished product in a foaming mold to obtain a foamed shoe material, wherein a ratio of a volume of the semi-finished product to a volume of a cavity of a lower mold of the foaming mold is 0.96 to 1.04.

5. The method as claimed in claim 4, wherein in the step S2, the volume of the semi-finished product is equal to the volume of the cavity of the lower mold of the foaming mold.

* * * * *